Figure 9:
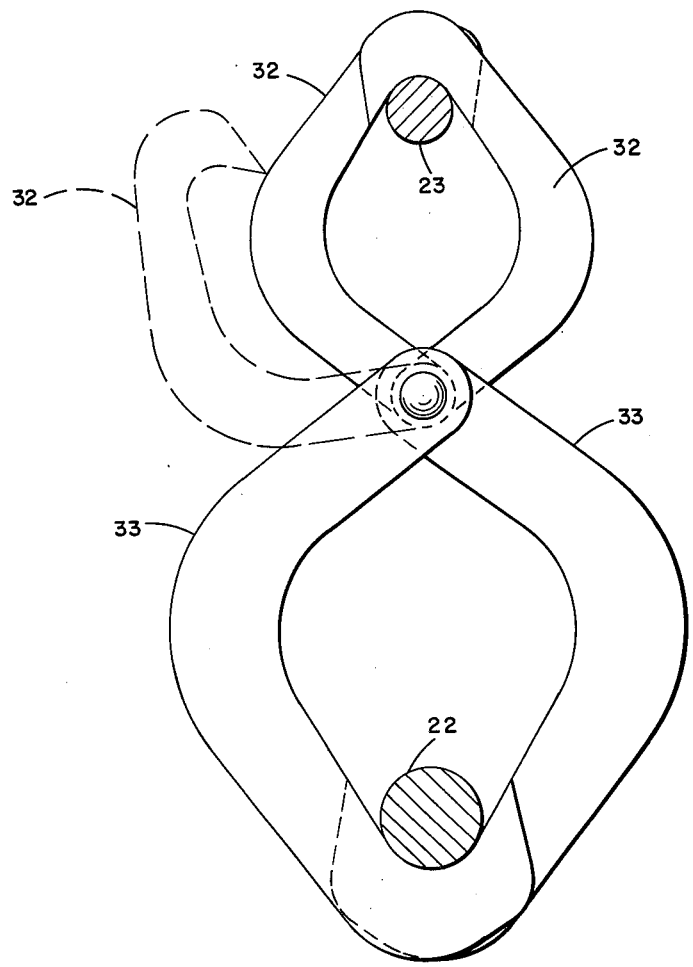

Sept. 21, 1965                F. W. DOWNEY                3,207,463
                            SUSPENSION DEVICE
Filed June 7, 1963                                    4 Sheets-Sheet 1
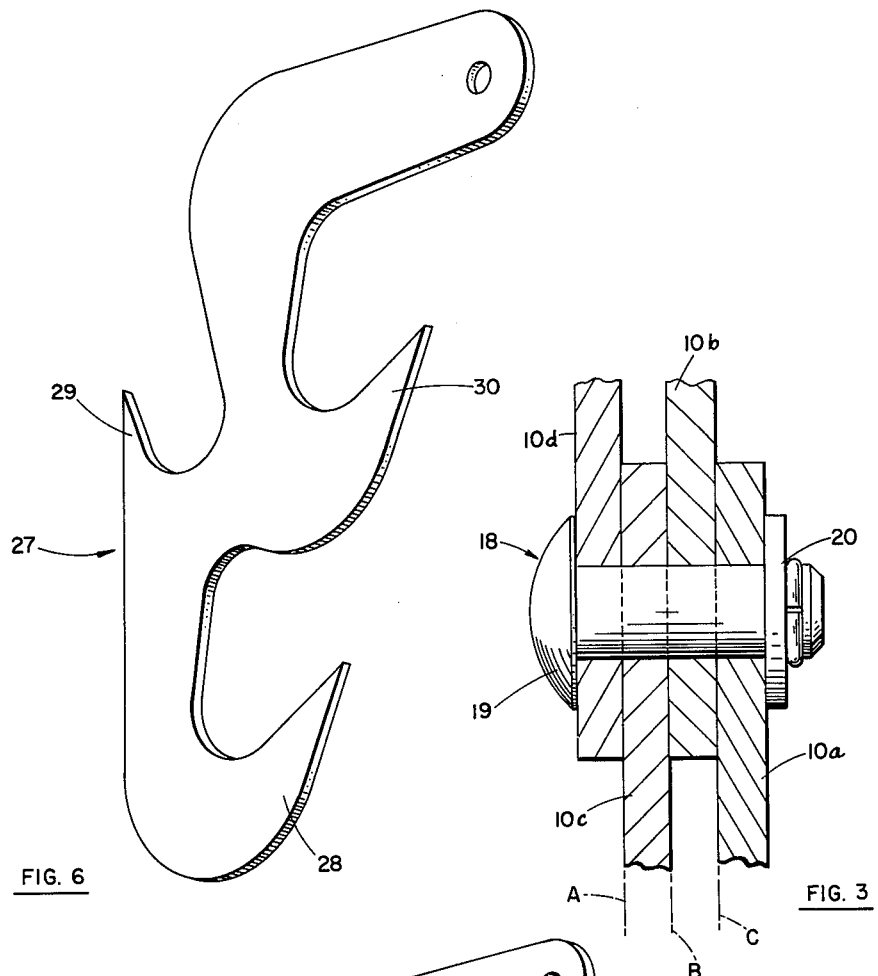
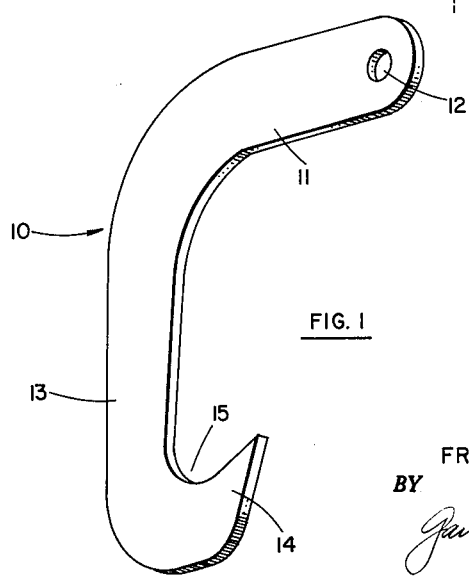
INVENTOR.
FRED W. DOWNEY
BY
ATTORNEYS

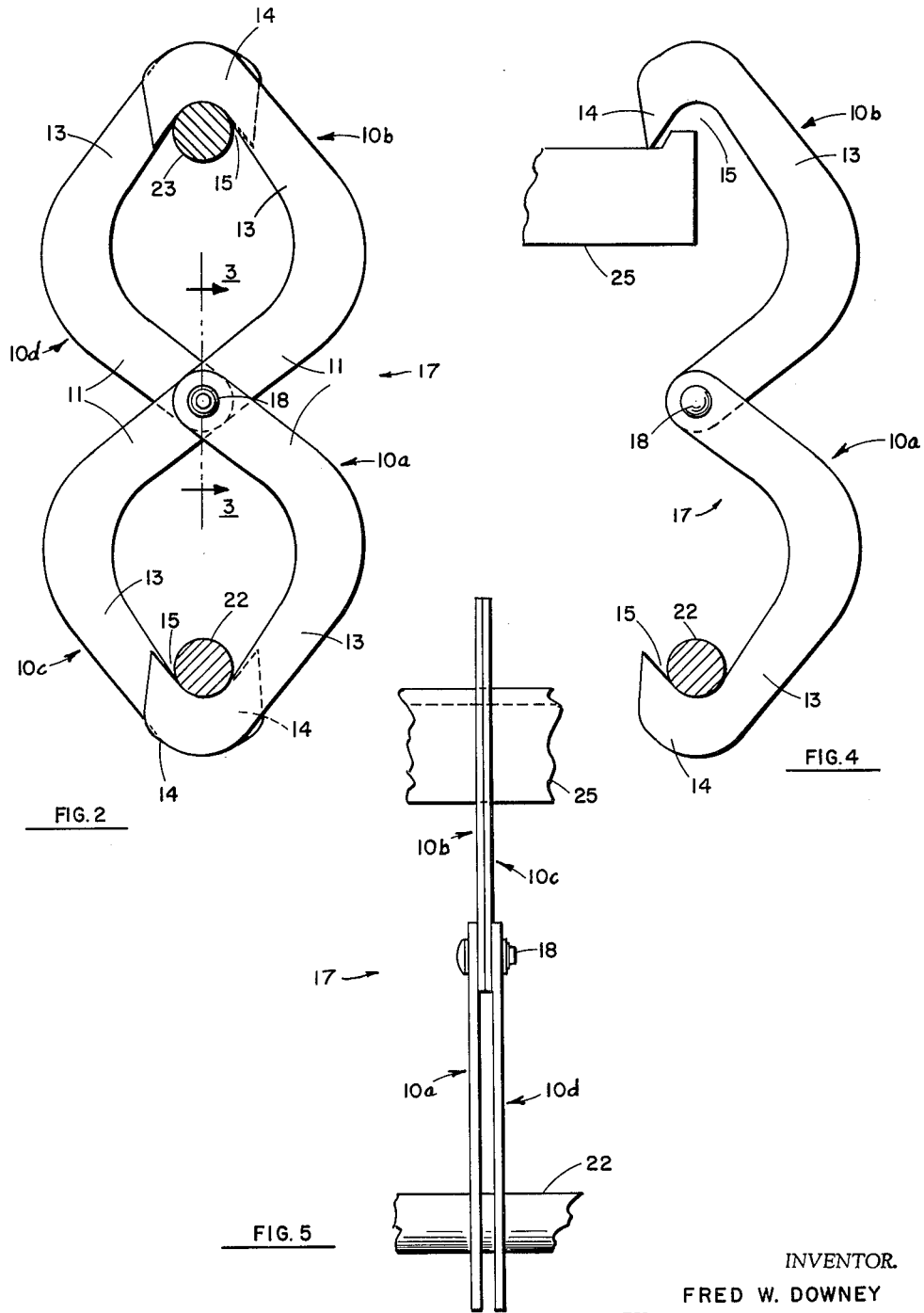

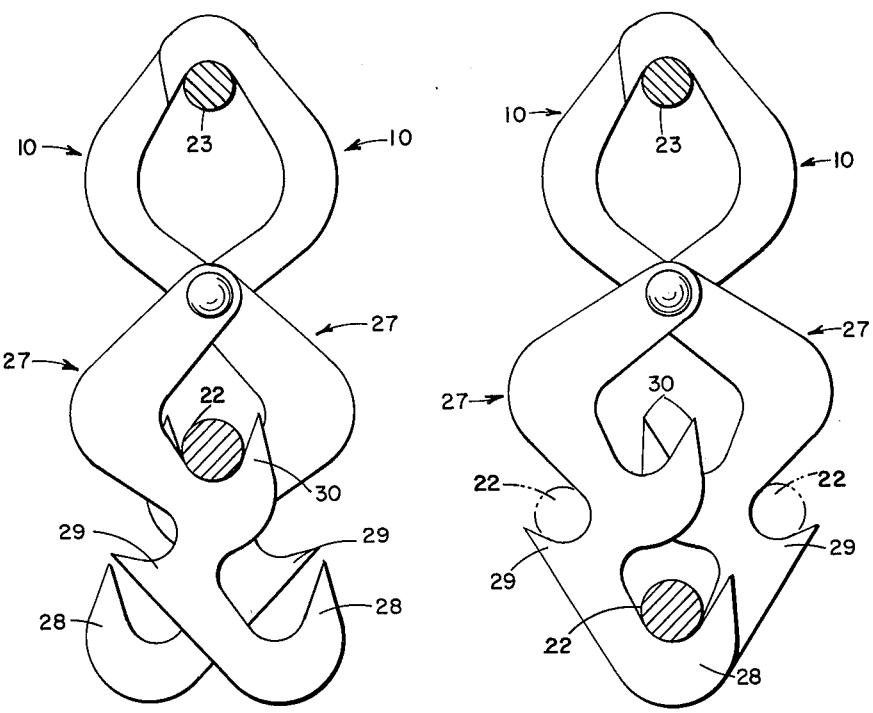

Sept. 21, 1965  F. W. DOWNEY  3,207,463
SUSPENSION DEVICE

Filed June 7, 1963  4 Sheets-Sheet 4

INVENTOR.
FRED W. DOWNEY
BY
ATTORNEYS

> # United States Patent Office

> 3,207,463
> Patented Sept. 21, 1965

3,207,463
SUSPENSION DEVICE
Fred W. Downey, 1709 Oahu Place, Costa Mesa, Calif.
Filed June 7, 1963, Ser. No. 286,400
6 Claims. (Cl. 248—339)

This invention pertains to an attaching device capable of quickly securing almost any object for suspension by whatever support element may be convenient.

The invention is constructed of four hook elements which may be somewhat C-shaped in configuration and are pivotally attached together. These elements may be identical and formed of sheet metal, which results in particularly economical construction. The books can move independently and pivot to a position where the support is engaged by the upper end of the unit, and the object to be held is at the other. By the inclusion of four of the hook elements it is possible to engage both the object and the support from both sides, or when necessary to engage only one side of either. This permits the unit to carry objects under circumstances where conventional pivoting hook supports cannot be utilized. The hook elements may be modified to provide additional suppodting shoulders to increase the capacity of the unit. Also, they may be furnished in various combinations and sizes such as a unit with two large hook members and two smaller elements.

Accordingly, it is an object of this invention to provide a quick and convenient means for supporting objects and fastening to almost any structural elment.

Another object of this invention is to provide a universal supporting device of high capacity yet low cost construction.

A further object of this invention is to provide a universal supporting device capable of engaging objects on either two sides or one side thereof.

An additional object of this invention is to provide a supporting device of great versatility, yet of particularly great load carrying capacity.

These and other objects will become apparent from the following detailed description taken in connection with the accompanying drawing in which:

FIG. 1 is a perspective view of one of the hook elements used in the attaching device of this invention, FIG. 2 is a front elevational view of the assembled attaching device, FIG. 3 is an enlarged fragmentary sectional view taken along line 3—3 of FIG. 2 illustrating the pivotal mounting of the hook elements, FIG. 4 is a front elevational view of the invention positioned to engage an object from only one side, FIG. 5 is an end elevational view of the arrangement of FIG. 4, FIG. 6 is a perspective view of a modified hook element that includes additional supporting surfaces, FIGS. 7 and 8 are front elevational views of an attaching device incorporating the unit of FIG. 6 positioned in two different ways, and FIG. 9 is a front elevational view of a further modification of the invention.

With reference to FIG. 1 of the drawing, the device of this invention may be assembled from four identical hook elements 10. These normally will be manufactured of sheet metal and are contoured to be generally C-shaped in plan. Hence, each of the elements 10 includes an inner leg 11 provided with an opening 12 near its distal end. Intermediate leg 13 extends from leg 11 and connects to hook extension 14. The sections 13 and 14 together define a recess 15 at their inner edges which is utilized in connecting the device of this invention to various objects, as will be discussed below.

The completed hook assembly 17, seen in FIG. 2, is made up of four of the unit 10 pivotally connected together in a side by side relationship by a suitable pin 18 extending through the apertures 12. Thus, as shown in FIG. 3, there is a rivet 18 passing through the apertures 12 of four of the hook elements 10, pivotally interconnecting the elements 10 and holding them together by virtue of the rivet head 19 at one end and the retainer and washer 20 at the other. These elements 10 in the assembled relationship illustrated in FIGURES 2 through 5 have been designated as members 10a, 10b, 10c and 10d in order that they may be more readily distinguished in the drawing, although the members in this embodiment are identical.

The members 10 are positioned such that two of them face in one direction while the other two face in the other as they are connected together. In other words, when viewed in side elevation, the open sides of two of the elements 10 will face to the right while the open sides of the other two face to the left.

In use of the device of this invention an object 22 is engaged by the recessed portions 15 of the lower two of the members 10, while the other two are rotated upwardly to contact the structural support 23. It can be seen that the attachment is effected in only a few seconds as the members 10 are appropriately pivoted. A particularly secure attachment may be effected by engaging the objects 22 and 23 on both sides of each of the objects 22 and 23. When this is done the possibility of inadvertently dislodging either the supported member or the structural element from the hook assembly 17 is virtually nonexistent.

Release of the device is accomplished as readily as the attachment merely by separating the elements 10 at their outer ends so that they are moved outwardly away from the members 22 and 23. In the released position the unit is very compact and may be folded so that it is no longer than any one of the hook members 10.

A maximum holding capacity of the unit may be achieved by arranging the hook members 10 in the manner illustrated in FIGS. 2 and 4. In this arrangement adjacent hook elements 10 are positioned to face in the same direction when the device is in its normal installed position. This places one adjacent pair of hooks facing one way while the other two adjacent hooks face in the opposite direction. In other words, when the unit is viewed in the position of FIG. 2, the lower right-hand hook member 10a is outermost and the upper right-hand element 10b immediately beneath it. These two members both have their open sides to the left. The lower left hook 10c is under the upper right hook, and innermost is the upper left-hand member 10d. The lower and upper left hooks 10c and 10d both have their open sides facing right.

As a result, the shear loads are distributed along the length of the shank of the pivot pin 18. Actually, there are three shear planes present when this is done. These planes are between the adjacent surfaces of the hook members. Consequently, the rivet 18 is subjected to loads along three shear planes, A, B and C rather than having the shear load concentrated. By spreading out the shear load in this manner the holding capacity of the device is increased.

The inclusion of four hook members 10 in construction of the device 17 offers additional advantages and the flexibilty not possible otherwise. There may be occasions where the structural member to which the assembly 17 is to be attached, or the object which it is supporting is not accessible from both sides. This would preclude engagement on both sides of such an object in the manner shown in FIG. 2. Nevertheless, the assembly 17 of this invention can provide an attachment under such circumstances, and it is not necessary that the objects be engaged from both sides.

As illustrated in FIGS. 4 and 5 the unit is being used to hold the object 22 beneath a projecting shelf 25. Obviously, it would not be possible to grip the shelf on both sides as was the case for the structural member 23. However, the device of this invention may be arranged to contact the shelf 25 at its outer edge, and in this manner still provide a supporting device. This is accomplished merely by pivoting two of the members facing the same direction to the top while the bottom two members likewise are those that face in the same direction. In the previously described positioning of the hook members 10, the two parts at the top faced opposite directions, and the same was true at the bottom of the unit. It can be seen, therefore, that by simple rotation of the members 10 the unit of this invention can be caused to form an attachment to various kinds of objects to suit particular situations encountered.

In some instances it may be desired to provide the unit with the ability to support a large number of objects at once. In such instances, the hook members 27 may be utilized instead of the elements 10. The elements 27 are generally similar to the previously described hook parts, including an outer hook portion 28. In addition, however, there are two more hook portions 29 and 30 in the intermediate portion of the member 27. The recess 29 faces outwardly while the hook portion 30 faces on the inside in the same direction as end hook 28. Hence, each of the elements 27 has three supporting portions 28, 29, and 30. The assembled hook, therefore, can support several objects at different locations, rather than having one supporting point as in the previously described arrangement.

Normally, as shown in FIG. 7, there will be only two of the modified members 27 included, which are intended to be positioned at the bottom of the unit to provide the extra hook surfaces. The other two elements will be the members 10, because the latter parts are more readily associated with a structural member to which the hook assembly is to be secured. However, it is possible to employ four of the members 27 in the assembly if desired.

An assembly utilizing the hooks 27 can assume different supporting positions such as the two illustrated in FIGS. 7 and 8. The particular supporting position depends upon the degree of rotation given to the members 27. This is a further example of the versatility of the unit.

In other instances it may be preferred to provide hook members of different dimensions in the assembled device. As seen in FIG. 9 there are two oppositely facing relatively small hooks 32 while larger members 33 also are provided. Thus, the device of this invention is adaptable to meet various conditions.

The foregoing detailed description is to be clearly understood as given by way of illustration and example only, the spirit and scope of this invention being limited solely by the appended claims.

I claim:
1. An attaching device comprising
four substantially C-shaped members,
    each of said members having an aperture through one end thereof,
    and hook means at the opposite end thereof,
and a single pivot pin means extending through said apertures for securing said C-shape members together, said apertures being in alignment,
    said C-shaped members being arranged so that two of said members open to one side, and the other two of said members open to the opposite side.
2. A device as recited in claim 1 in which
said C-shaped members are arranged relative to said pivot pin means such that when two of said C-shaped members are positioned to extend in one direction from said pivot pin means,
and two of said C-shaped members are positioned to extend in the opposite direction from said pivot pin.
    the outer two adjacent C-shaped members axially of said pivot pin means on either end thereof face in the same direction.
3. A device as recited in claim 1 in which
at least one of said C-shaped members includes at least one additional hook portion inwardly of said opposite ends thereof.
4. A device as recited in claim 1 in which
two of said hook members include a duality of additional hook surfaces inwardly of said opposite ends thereof,
    one said additional hook surfaces being on one side of said hook members,
    and the other of said hook surfaces being on the opposite side of said hook members.
5. A device as recited in claim 2 in which said four substantially C-shaped members are of identical configuration.
6. A device as recited in claim 5 in which said C-shaped members are of sheet metal construction.

References Cited by the Examiner
UNITED STATES PATENTS

| 253,942 | 2/82 | Overdonk | 248—308 |
| 289,213 | 11/83 | Bracking | 248—308 X |
| 2,723,816 | 11/55 | Drysdale | 248—340 X |
| 2,767,952 | 10/56 | Wolar | 249—339 |
| 2,842,822 | 7/58 | Bennett | 24—73 |
| 2,928,636 | 3/60 | Flower | 248—61 |
| 2,959,389 | 11/60 | Richter et al. | 248—341 X |

FOREIGN PATENTS

| 102,471 | 7/98 | Germany. |
| 21,878 | 10/98 | Great Britain. |
| 12,140 | 8/00 | Sweden. |

CLAUDE A. LE ROY, *Primary Examiner.*